(12) United States Patent
Kleen et al.

(10) Patent No.: US 6,234,493 B1
(45) Date of Patent: May 22, 2001

(54) LEVEL CONTROL SYSTEM

(75) Inventors: Berend Kleen; Robert Sohn, both of Hannover (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 09/309,815

(22) Filed: May 11, 1999

(30) Foreign Application Priority Data

May 13, 1998 (DE) .............................................. 198 21 305

(51) Int. Cl.[7] .......................................................... B60S 9/00
(52) U.S. Cl. .................................. 280/6.152; 280/6.157; 280/6.159; 280/5.514
(58) Field of Search ............................... 280/6.15, 6.152, 280/6.157, 6.159, 5.514

(56) References Cited

U.S. PATENT DOCUMENTS

| | | |
|---|---|---|
| 4,678,203 | 7/1987 | Rohner et al. . |
| 4,965,878 * | 10/1990 | Yamagiwa et al. ................. 280/6.15 |
| 4,967,360 * | 10/1990 | Fukunaga et al. ................ 280/6.152 |
| 5,048,867 * | 9/1991 | Gradert ............................. 280/6.152 |
| 5,080,391 * | 1/1992 | Kawabata ........................... 280/6.15 |
| 5,082,308 * | 1/1992 | Jones ................................. 280/6.152 |
| 5,083,275 * | 1/1992 | Kawagoe et al. ................. 280/6.152 |
| 5,087,072 * | 2/1992 | Kawarasaki ....................... 280/6.152 |
| 5,130,927 * | 7/1992 | Kunishima et al. .............. 280/6.152 |
| 5,193,849 * | 3/1993 | Holzmann ......................... 280/6.157 |
| 5,220,505 * | 6/1993 | Yokote et al. ...................... 280/6.15 |
| 5,261,691 * | 11/1993 | Laichinger et al. ................ 280/6.15 |
| 5,286,059 * | 2/1994 | Tabe .................................... 280/6.15 |
| 5,287,277 * | 2/1994 | Mine et al. ......................... 280/6.15 |
| 5,338,010 * | 8/1994 | Haupt ................................ 280/6.152 |
| 5,388,857 * | 2/1995 | Wernimont et al. ................ 280/6.15 |
| 5,499,845 * | 3/1996 | Geiger et al. ..................... 280/6.152 |
| 5,684,698 * | 11/1997 | Fujii et al. .......................... 280/6.15 |
| 5,769,400 * | 6/1998 | Holzl et al. ....................... 280/6.152 |
| 5,855,379 * | 1/1999 | Buma et al. ........................ 280/6.15 |
| 5,865,453 * | 2/1999 | Harada et al. .................... 280/6.152 |
| 6,015,155 * | 1/2000 | Brookes et al. .................. 280/6.152 |
| 6,049,746 * | 4/2000 | Southward et al. ............. 280/6.152 |
| 6,061,615 * | 5/2000 | Karthacuser ..................... 280/6.152 |

FOREIGN PATENT DOCUMENTS

| | | |
|---|---|---|
| 3820124 | 12/1988 | (DE) . |
| 19524730 | 1/1997 | (DE) . |
| 19546730 | 6/1997 | (DE) . |
| 19622677 | 12/1997 | (DE) . |

* cited by examiner

Primary Examiner—Lanna Mai
Assistant Examiner—Toan To
(74) Attorney, Agent, or Firm—Proskauer Rose LLP

(57) ABSTRACT

A level control system controls the distance between the vehicle axles and the vehicle frame of a vehicle. The suspension is a full or partial air suspension, wherein the vehicle frame over the vehicle axles is supported via air suspension bellows. A vehicle inclination, i.e. a non-parallel alignment between vehicle frame and one or more of vehicle axles may occur as a result of various situations which may be dramatically different from one another. Uneven support of the vehicle represents one cause of vehicle inclination, for example, when one wheel of a vehicle axle is standing on the sidewalk. In order to avoid air losses, a vehicle level is not compensated for while the vehicle is stopped. Instead, the existing inclination is maintained and is entered into the control system as a target level. All level changes which occur due to changes in the load of the vehicle are compensated for by means of this prescribed target value. When the vehicle later starts to travel, the pressures in the air suspension bellows need to be modified only slightly, if at all, further conserving air consumption.

14 Claims, 2 Drawing Sheets

LEVEL CONTROL SYSTEM

BACKGROUND OF THE INVENTION

The present invention relates to a level control system operated by pressure media, and in particular, a level control system for a vehicle in which at least one air suspension bellow is provided for support of the vehicle frame above at least one vehicle axle, and wherein the level of the vehicle frame above the vehicle axle is determined by the prevailing pressure in the air suspension bellow.

A level control system of this type is disclosed, for example, in German patent application DE 195 46 730 A 1, which is incorporated herein by reference. In such known system, inclination of a vehicle caused by asymmetrical loading is compensated for only when leveling of the vehicle can be achieved while concurrent maintenance of a required minimum pressure level in the air suspension bellows via which the vehicle body is supported on the vehicle axles is possible. When leveling of the vehicle cannot be accomplished while the minimum pressure level is maintained, the inclined position of the vehicle body relative the vehicle axles is temporarily retained, and subsequently remains unchanged until the occurrence of a different load situation in which leveling permits maintenance of the minimum pressure level.

In the known system, a test is carried out to determine whether leveling is possible without reduction of pressure below the required minimum pressure level, in accordance with which a number of opposing control attempts are made in order to compensate for the deviation sensed by the control system. If the number of attempts do not exceed a predetermined number, maintenance of the minimum pressure level is ensured. The multiple opposing control attempts, however, require introduction and venting of air, resulting in an overall loss of air pressure affecting the air supply system.

In addition to vehicle inclinations caused by loading, inclinations of the vehicle body may result from uneven footing, such as for example, where one wheel of the vehicle axis rests atop the sidewalk.

The problem of undesirable air loss attendant the previously mentioned air admission and venting processes involved with a leveling of the vehicle in general is exaggerated in circumstances in which the vehicle inclination is the result of uneven footing as compared to a load-related inclination. All air losses which are not absolutely necessary should advantageously be avoided, particularly in level control systems where the air supply system is fed by a compressor driven by an electric motor and which provides a limited air supply.

The above stated problem is further aggravated by the fact that when the vehicle has gone from the condition of uneven footing, which resulted in the inclined position, to a footing which is again even, the air suspension bellow pressures which changed in the course of compensation while in the inclined position must again be reversed, and this again involves air loss.

In the event of vehicle inclinations caused by uneven footing, the procedure in accordance with known systems used for inclinations caused by loads cannot, therefore, be effectively applied, since application of such would exaggerate the problem of undesirable air loss.

It is therefore the object of the present invention to provide a level control system operated by pressure media of the type mentioned above in which no unnecessary air losses occur, particularly when a vehicle inclination is caused by uneven footing.

SUMMARY OF THE INVENTION

In accordance with these and other objects of the invention, there is provided a level control system for regulating a distance between a vehicle frame and a vehicle axle in a vehicle in which an inclination may occur whereby the axle is not aligned parallel to the vehicle frame. Included in the vehicle is at least one air suspension bellow for supporting the vehicle frame above the vehicle axle, the distance between the vehicle frame and the vehicle axle being determined by the pressure prevailing in the air suspension bellow. A valve arrangement is also provided for adjusting a pressure of air within the air suspension bellow. The vehicle is further equipped with at least one sensor for determining an actual distance between the vehicle frame and the vehicle axle and a regulating system for receiving a target level representative of a desired distance between the vehicle frame and the vehicle axle. The regulating system controls the valve arrangement in such manner that a control deviation produced from a difference between a target level and the actual distance corresponding thereto is minimized. By prescribing a value of the target level equalized with the current actual level, a control function of the regulating system can be deactivated. The regulating system is activated for a traveling state defined when a travel speed of the vehicle exceeds a predetermined minimum speed and no actuation of a brake takes place, and in which the target level is a target traveling level to thereby indicate the desired distance between the vehicle frame and the axle while in such state. Similarly, the regulating system is also activated for a stoppage state indicative of a stopped condition of the vehicle, the target level being a target stoppage level to thereby indicate the desired distance between the vehicle frame and the vehicle axle while in the stoppage state. The actual level of the vehicle frame relative to the vehicle axle is indicated to the regulating system for use as the target stoppage level even when the actual level reflects a vehicle inclination. The regulating system is also activated for a shunting state initiated following the stoppage state indicative of a travel condition in which a travel speed is below a predetermined minimum speed indicative of a traveling state, the target level being a target shunting level indicative of the desired distance between the vehicle frame and the vehicle axle while in the shunting state.

In accordance with embodiment of the invention, leveling of a vehicle can be advantageously applied in a more versatile manner for correction of inclinations than was heretofore permitted by the known system described above. The invention advantageously further permits implementation without any complicated processes dependant upon the possible presence of an inclined position, since the same procedure is consistently selected independent of the whether or not a vehicle inclination in fact exists.

The invention provides further advantage in that virtually no additional costs are involved in its practical realization, since a control program for a level control system already provided in a vehicle need only be modified. Moreover, since the invention utilizes target value indications which depend on the operating state of the vehicle in the leveling process, implementation thereof is facilitated.

The invention is explained in further detail through a example of an embodiment which follows read in conjunction with the accompanying drawings, in which like reference numerals designate elements providing the same function.

DETAILED DESCRIPTION OF THE PREFERRED EMBODIMENT

Figure 1:
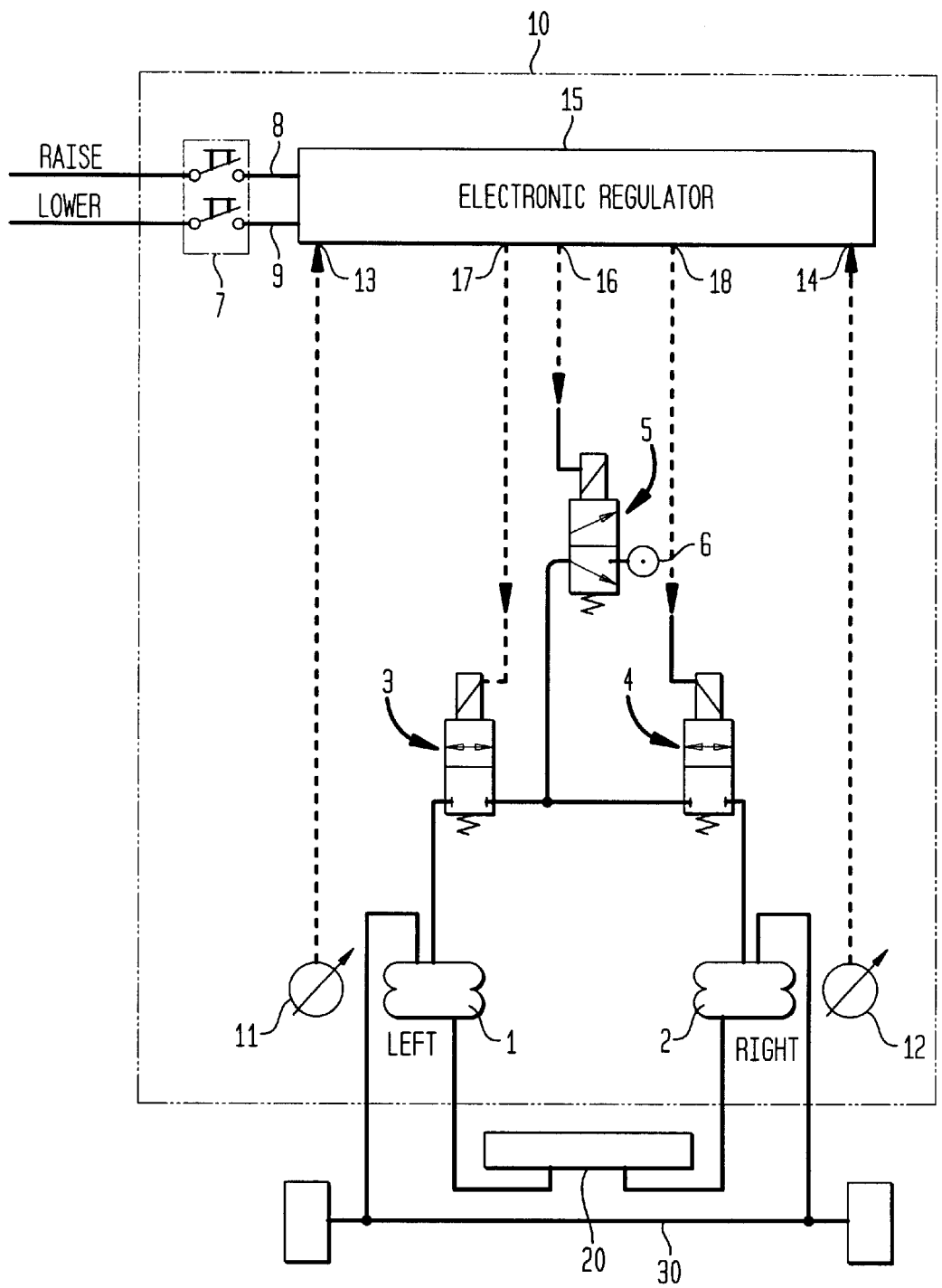
FIG. 1 is a schematic view of the various components of a vehicle in which the invention finds application.

According to an embodiment of the present invention, a level control system (10) is shown schematically in FIG. 1. The invention finds application in a vehicle equipped with air suspension in which the vehicle frame, i.e. the suspended portion of the vehicle, bears on the vehicle axles, i.e. the non-suspended portion of the vehicle, via one or more air suspension bellows 1, 2, for example, as represented schematically in FIG. 1. The various pressures present in the air suspension bellows 1, 2 supporting the vehicle frame (20) collectively determine the level of the vehicle frame (20), i.e. its elevation above the vehicle axles (30). The air suspension in the vehicle may be provided as full air suspension or partial air suspension.

The above vehicle equipped with air suspension additionally includes an electronic control system for controlling the level of the vehicle frame. Valves 3, 4 are provided to regulate the pressures in respective air suspension bellows 1, 2 corresponding thereto by admitting air to the air suspension bellows from an air supply 6 or by venting them, for example by means of a coordinating valve 5, on the basis of electronic adjustment signals 16, 17, 18 received from the electronic control system. Deflection sensors 11, 12 are provided to sense the actual deflections, i.e. the distance between the vehicle frame and the vehicle axles. The minimum vehicle equipment requirement for implementing the present invention is one air suspension bellow with one corresponding valve and one deflection sensor. An electronic control system is also required, as noted above, to control the leveling of the vehicle frame.

A distinction is made herein between the above mentioned overall electronic control system, and a specific electronic regulator which carries out the actual control function, but which is itself a part of the superimposed electronic control system, designated by reference numeral 15 in FIG. 1. The superimposed functions of the electronic control system include general steering tasks, the determination of operating states of the vehicle, and transmission of target values to the underlying electronic regulator which depend upon the current operating state of the vehicle.

A target deflection representing the target level of the vehicle frame is conveyed to the electronic regulator 15. The electronic regulator 15 is further supplied with signals 13, 14 representative of the actual measured deflection from the sensors 11, 12 and produces in response thereto the adjustment signals 17, 18 which are transmitted by the appropriate outputs provided on the electronic regulator 15 to the valves 3, 4 responsible for the modification of pressures in the air suspension bellows 1, 2.

In the event of a deviation from the target deflection, the electronic regulator alters the pressure in a given air suspension bellow 1, 2 in such manner that the actual deflection measured by the corresponding sensor is adjusted to match the prescribed target deflection. The electronic regulator 15 which carries out this level adjustment for the individual air suspension bellows 1, 2 is provided in the form of a digital regulator with fixed sampling time. At the points in time determined by the sampling time, the measured value of a sensor is sampled, and such value remains valid as the measured deflection corresponding to the particular sensor until the next sampling point in time.

In a vehicle with full air suspension and two vehicle axles, four air suspension bellows are normally provided. Such a vehicle includes one air suspension bellow in the vicinity of each of the left and right wheels of the front axle, and one air suspension bellow similarly located near each of the left and right wheels of the rear axle. It is noted, that when a pair of air suspension bellows are provided on the wheels of the rear axle instead of a single air suspension bellow, for purposes of the example given herein, such arrangement is to be logically regarded as including a single air suspension bellow. Since a planar surface is definable in space by three points, a total of three sensors are sufficient for the level control of the abovementioned four air suspension bellows. Normally, two sensors are disposed on the rear axle and one sensor on the front axle, whereby the rear axle sensors are located on the left and right sides of the rear axle in proximity of the wheels, and the front axle sensor is located anywhere on the front axle, preferably in the center of the front axle.

In a vehicle with partial air suspension and two vehicle axles, the front axle is usually provided with leaf spring suspension, while the rear axle is equipped with air suspension including air suspension bellows disposed on left and right sides thereof. Alternative to use of two air suspension bellows on the rear axle, it is possible, in principle, to provide only one air suspension bellow, and which is best located approximately in the center of the rear axle. Where two air suspension bellows are employed, two sensors are normally provided on the left and right sides of the axle. Alternatively, where only one air suspension bellow is provided, only one sensor is required, and can be located at any point along the axle, generally, however, positioned at the center of the axle. It should be further noted, that in addition to the above arrangement, there are also applications in which the rear axle is suspended with leaf springs and the front axle is provided with air suspension.

An air-suspended vehicle axle subject to level control is therefore provided with one or two air suspension bellows, and with one or two sensors. If two air suspension bellows are employed on an axle, independent adjustment of pressures within left and right side air suspension bellows to bring about asymmetrical pressure conditions in the air suspension bellows may be used to influence an inclination of the vehicle frame, i.e. a state in which vehicle frame is not parallel to the particular vehicle axle. This is of course not possible with an axle which includes only one air suspension bellow. In an analogous manner, while an inclination of an axle can be detected when two sensors are provided, as indicated by an actual deflection detected by the left sensor, a value of which is not in agreement with the actual deflection detected by the right side sensor, such determination would not be possible by the use of only one sensor.

During travel, a traveling level of the vehicle frame is adjusted in accordance with signals transmitted by the electronic regulator. The target level prescribed by the electronic control system to the electronic regulator is the target travelling level.

Control processes which are carried out during travel operate to maintain the specified traveling level, including, for example, correction of inclinations resulting from gradual pressure drop due to leakage of the air suspension system or deviations in level which may occur due to a shift of the center of gravity in the vehicle body on an ascending or descending slope. In contrast with the conditions mentioned below while in a stopped position, the regulating processes performed during travel take place with a comparatively greater regulating delay, because dynamic level influences which occur, for example, in turns, are advantageously suppressed.

The traveling level represents a value of the distance between a vehicle axle and the vehicle frame as specified by the vehicle manufacturer, i.e. a parameter which may not be modified. The traveling level is normally entered in a semi-automatic mode, accomplished by the following procedure. First, the vehicle frame is lifted above the axles by feeding pressure into the air suspension bellows using remote controls, mentioned in greater detail below, in a special learning mode. Suitable spacer blocks are then inserted between the vehicle axles and the vehicle frame. Once the spacers are in place, air is vented from the air suspension bellows, causing the vehicle frame to descend onto the blocks. The actual deflections detected by the sensors represent the target traveling level, which data is transmitted to and stored in the electronic control system. This learning process is only required for initial calibration of a new vehicle, or in conjunction with a required servicing of the vehicle.

When the vehicle is standing still, a stoppage level is adjusted which is equal to the level which is automatically present at the beginning of the stoppage of the vehicle from a travelling state. This level, detected by the sensors, is transmitted during stoppage of the vehicle to the electronic regulator, and is stored therein as a target stoppage level.

The level of the vehicle frame determined by the target stoppage level may be modified by the driver, for example during loading and unloading operations. The driver thus sets a new target stoppage level. Adjustment is permitted over a range prescribed by the vehicle manufacturer which thereby defines a minimum and a maximum distance between the vehicle frame and the corresponding vehicle axle.

Manual setting of the target stoppage level is implemented by means of the above-mentioned remote control. The adjustment may be made inside or outside the driver cabin.

The remote control includes a switch (7) which is connected via electrical lines (89) to the electronic control system. By actuating the switch, (7) which may be provided, for example, in form of a push button including functions for raising and lowering of the frame, the desired target stoppage level of the vehicle frame is set and stored. It is noted that raising of the frame increases, and lowering of the frame decreases the value of the target stoppage level.

Due to the fact that the target stoppage level is always present in the electronic regulator as a target value, i.e. serving as a reference magnitude for regulating adjustment, the control function provided thereby is active even while the value of the target stoppage is being modified, thereby directly effecting controlled adjustment of the actual stoppage level by actuation of the push button.

The process underlying the level control function in accordance with the invention is illustrated by the following example with reference to a controlled, air suspended vehicle axle in a stopped condition, the vehicle being equipped with an air suspension bellow on left and right axle locations, as well as a sensor on the left and right side of the vehicle axle. The general nature of the process provides the basic function as that disclosed in German patent application DE 195 46 730 A1 mentioned above.

In accordance with the prescribed target stoppage level stored in the electronic regulator, the left air suspension bellow is assigned a target level $X_{SL}$ and the right air suspension bellow a target level $_{SR}$.

Figure 2:
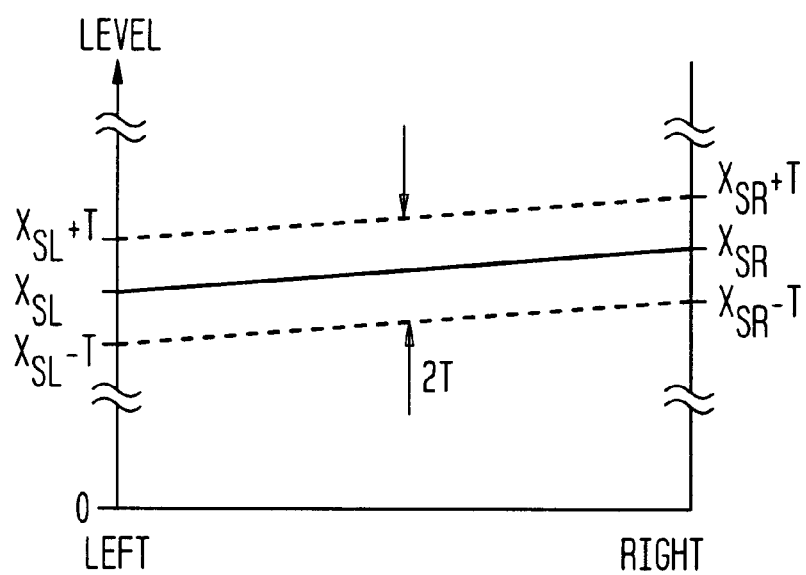
FIG. 2 is a graphical representation of a tolerance range for left and right target levels.

Turning now to FIG. 2, a tolerance range which extends from the given target value by a deflection tolerance T to higher and to lower values is created around these target level values $X_{SL}$ and $_{SR}$. The tolerance range thus has a width of 2 T. In practical applications, the magnitude of the deflection tolerance depends to a great extent on the type of vehicle and the design specifications thereof, and may amount, for example, to about T=5 mm, such that the observance of the target distance within a range of a few millimeters is made possible.

As explained above, the actual levels detected by the sensors are transmitted to the electronic regulator. These measured level values are assumed herein to include an actual level $X_{IL}$ corresponding to the left air suspension bellow and an actual level $X_{IR}$ corresponding to the right air suspension bellow.

As a load is modified, the weight of the vehicle body changes, thereby changing the suspension characteristics of the air suspension bellows relative to the corresponding axle. As a consequence, the actual levels $X_{IL}$ and $X_{IR}$ are also altered.

If the load increases, for example, on the left side, a smaller value $X_{IL}$ results. If the increase in load exceeds a certain limit, the new actual level $X_{IL}$ transmitted by the left sensor lies outside the target value tolerance range, i.e. it is less than the lower limit of the target range ($X_{SL}$ −T).

In response to the failure of the actual deflection to reach the target value tolerance range, the electronic regulator increases the pressure in the air suspension bellow located on the left side of the vehicle axle until an actual level $X_{IL}$ which lies again within the target tolerance range is transmitted to the electronic regulator by the left sensor.

Should the actual level $X_{IL}$ corresponding to the right side fail to reach the specified tolerance range as the load is increased, then air is also admitted to the air suspension bellow on the right side until the actual level $X_{IL}$ again lies within the tolerance range. Concurrently required air admission into the air suspension bellows takes place in timely alternation between the left and right air suspension bellows, utilizing a time multiplex process similar to the operation of a scanning regulator.

If the load of a vehicle is reduced, the air suspension bellows of a given axle expand, and the actual levels $X_{IL}$ and $X_{IR}$ are increased. Should the measured levels exceed the target value tolerance range ($X_{IL} > X_{SL} +T$ or $X_{IR} > X_{SR} +T$), the left and right side air suspension bellows are vented until the actual levels $X_{IL}$ and $X_{IR}$ are reduced to a value which again lies within the tolerance range.

The regulating function of the electronic regulator can also be deactivated temporarily. This deactivation provides the general function as that described in the above mentioned German patent application DE 195 46 730 A1 which pertains to a device of this type. During the deactivation period, a target level which is equal to the actual level is transmitted to the electronic regulator.

Such equalization results in formation of a temporary replacement tolerance range replacing the prescribed target value tolerance range described above, and in response to an instruction given to the electronic regulator the system is converted over to this temporary replacement tolerance range.

The replacement tolerance range is defined by placing a tolerance range with plus and minus the deflection tolerance T around the existing actual level $X_{IL}$ for the left side and the actual level $X_{IR}$ for the right side such that an overall tolerance range 2T results. The utilization of this tolerance range ensures that a control deviation no longer remains, since the replacement tolerance range is applied to the existing actual values, and thereby the current position of the vehicle frame in relation to the vehicle axles is maintained.

Inclinations of the vehicle frame may at times occur due to various different situations such that the frame is not aligned parallel to the vehicle axles. Since the vehicle frame constitutes the lower boundary of the vehicle body presenting rigid structure, when an inclination exists between the vehicle frame and a vehicle axle, such inclination may be frequently transmitted to the other axles of the vehicle. A controlled air-suspended vehicle axle in accordance with the above described system will therefore often be affected by the transmission of any inclination present elsewhere in the vehicle.

Such an inclination is produced, for example, when the right wheel of an air suspended vehicle axle climbs onto the right sidewalk and the air suspension bellow on the right side of the vehicle axle is deflected even though the load of the vehicle has not changed by such circumstance.

A transmitted inclination, as noted above, also occurs in a vehicle with partial air suspension when the right wheel of the front axle equipped with leaf-spring suspension runs up onto the sidewalk on the right side. Normally, such vehicles are equipped with strong stabilizers on the front axle, which operate to force the air suspended controlled rear axle into an inclination. This effect is especially prevalent in an empty vehicle when a dominant front axle determines, to a great extent, the position of the vehicle frame.

An additional example illustrating the potential occurrence of such inclination pertains to a situation in which both wheels located on a common side of a vehicle, for example the right side, run up onto the sidewalk. Although the deflections of the frame relative to each of the axles would not be directly changed by the parallel lifting on the right side because of unchanged load, the inclination of the axles relative to the level road surface would, however, create a tilting moment which thereby shifts the center of gravity of the vehicle structure, creating an inclination of the vehicle frame relative to the vehicle axles.

An inclination may also occur when the vehicle stops on an incline, i.e. an ascending or descending slope. Although the deflections of the frame with respect to the axles initially remain unchanged on both sides, the above-described shift in the center of gravity may, in analogous manner, result in an inclination of the vehicle frame relative to the vehicle axles.

During brake applications, the vehicle executes a nodding motion. When forceful braking is applied, a rebound and deflection occurs on the rear axle over a deflection range of about 30 to 40 mm. When such suspension related movements occur, the adhesional and frictional influences present in the mechanical connection between vehicle frame and the vehicle axles, for example the shock absorbers, steering joints, etc., may produce a lingering inclination following the occurrence of the aforementioned rebound effect. It is quite possible, for example, for an inclination with an asymmetrical deflection deviation of 10 mm to occur in the course of forceful braking, representing a deviation above or below the deflection distance corresponding to the target traveling level.

Based on the dramatically different causes of vehicle inclination outlined above, no analysis of a possibly present inclination is performed prior to taking corrective action. Because it is furthermore known that, for example, in a vehicle with partial air suspension, adjustment of the air suspension bellows of the controlled air-suspended vehicle axle to effect correction of an inclination may be problematic because of the above-mentioned stabilizer action, no attempt is made to adjust the inclined vehicle frame of a vehicle to an even level relative to the vehicle axles by appropriate pressure input into the air suspension bellows.

Rather, a different approach is intentionally followed, and in accordance with which the fact of whether or not a vehicle inclination is in fact present is not taken into account. This approach is explained below, in particular, through an example illustrating the various operating states of a vehicle. These operating states include the process of stopping following unbraked travel (phase 1), loading or unloading while stopped in a stoppage state (phase 2), a shunting state (phase 3) representing a transition state between starting of travel from the stoppage state, in which state the vehicle is traveling slower than a normal travel state without braking, and a traveling state (phase 4). During phase 1 prior to application of brakes, the target traveling level is transmitted to the electronic regulator thereby activating the control function. This state is maintained as long as no braking occurs.

An appropriate signal is fed to the control system on the input side thereof reflecting the vehicle state, from which the control system can recognize whether the operating brake of the vehicle is being actuated or not. In the most simple case, the signal of the brake light switch can be utilized for this purpose.

If the control system detects an actuation of the operating brake, the level control function is deactivated. The reason for such deactivation is based upon attendant warping of the vehicle frame relative to the vehicle axles caused by the inertial forces acting on the vehicle during braking. Since the assumption must be made in level corrections that the vehicle structure is dynamically supported via the air suspension bellows, such level corrections can not be effectively implemented in a warped vehicle.

As mentioned above, the structure of the vehicle is subject to movements of varying magnitude during braking. These movements, however, diminish after a certain damping period, the duration of which depends upon the model and specifications of the vehicle, and which typically lasts from about 3 to 10 seconds.

The damping period typical to the vehicle is used as a delay period. The delay period represents a parameter which is given as an instruction to the control system.

Starting at the moment when braking begins, and simultaneously with the deactivation of the control function, a time function element is started and is active for the duration of the delay period. The control function remains deactivated while the time function element is active.

Upon completion of the delay period, the vehicle structure has sufficiently stabilized such that level corrections are again feasible. At this point in time, the time function element switches from the active to a passive state, and the control system is once again activated. In the event the vehicle is still traveling at this point in time, the target traveling level continues to be transmitted to the electronic regulator.

In the event, however, that the vehicle is stopped at the end of the delay period (vehicle speed is zero), phase 2 representative of vehicle stoppage begins. The activation of the control function begins by prescribing the target stoppage level to the electronic regulator. The target stoppage level represents the stoppage level which occurs automatically on the vehicle during the delay period. It is determined at the time of the completion of the delay period by entering current actual levels existing at that point in time. This process is entirely independent of the fact of whether or not a vehicle inclination takes place. The target stoppage level is then stored in the control system for possible subsequent modification by means of the aforementioned remote control.

Due to the fact that the pressures in the air suspension bellows were not changed during the brake application which led to the stoppage of the vehicle, the same pressure conditions that were present during the preceding travel in phase 1 prior to braking still prevail. If travel is resumed without changing the load according to phase 4 which is explained in further detail below, no level control processes whatsoever have been carried out between phase 1 and phase 4, and therefore no air losses have occurred. This also applies when the target stoppage level is based on a vehicle inclination which has occurred in the course of stopping.

Depending on the situations discussed above for creating a vehicle inclination, the target stoppage level as it was set during the delay period may or may not be different from the normally even traveling level present during phase 1 prior to braking. The following conditions are representative of the possible configurations of the target stoppage level. It may be even (parallel alignment of the frame with the axles) and at a level equal to the traveling level (case 1) or different from the traveling level (case 2). Alternatively, an inclination may be present and in which the level of the frame relative to an axle center (center of the vehicle axle between right and left wheel) is equal to the traveling level (case 3) or an inclination may exist in which the level of the frame relative to the axle center is different from the traveling level (case 4). Where level equality of the target stoppage level and the traveling level measured with respect to the axle center exists according to cases 1 and 3, the difference in distance between the vehicle frame and axle centers for the traveling level as compared with the target stoppage level (deviation of the target stoppage level from the traveling level relative the axle center as a directed magnitude) is equal to zero. Conversely, in cases 2 and 4, the difference in distance between the vehicle frame and the axle center for the traveling level compared with the target stoppage level is not equal to zero, and may be less than or greater than zero.

If the vehicle is loaded or unloaded while the vehicle is stopped, the actual level is stabilized in the manner described earlier regarding maintenance of the target stoppage level, which means that the pressures in the air suspension bellows change as a function of the load change. In this manner, the pressure conditions in the air suspension bellows are adapted to the new load situation. As a result, the pressures in the air suspension bellows which are adjusted based upon the new load conditions are normally very close to the pressure conditions of the traveling level. As the vehicle passes into a traveling state (phase 4), as explained below, the pressures in the air suspension bellows must therefore, at most, be only minimally adapted. Thus, the stabilization of the stoppage level which responds exclusively to a change in load, results overall in a minimization of the level control processes.

When the target stoppage level is based on a vehicle inclination present during the delay period, it will be understood that such vehicle inclination is maintained with all control processes based on load conditions.

The target stoppage level can be modified in the described manner by means of the remote control, for example, when a level adjustment is to be effected at a loading ramp. During modification, the direction of the target stoppage level which is set during the delay period is maintained, i.e. a parallel shift in height relative to the target stoppage level during lifting or lowering of the frame takes place. With this modification, the distance between traveling level of the frame relative to the axle center changes. The current distance from the traveling level relative to the axle center is calculated at a given point in time from the modified target stoppage level relative the axle center and the traveling level used as a parameter.

As explained above, the modification of the target stoppage level can only be effected within a predetermined range of distance between vehicle frame and vehicle axle. If a vehicle inclination exists during the stoppage of the vehicle, during a frame lifting operation a limit of the level range will first be reached on the side on which the vehicle frame is more elevated due to the vehicle inclination. At this point, additional level increase is not possible. However, a level increase is still admissible on the other, i.e. the lower, side of the axle. By further actuation of the remote control lift scanner, the level of the frame is maintained at the point where it has already reached its limit, while the other side continues to be lifted up to the limit of the level range at that location.

This type of manual modification also applies to a lowering operation. When a limit of the level range has been reached through change of the stoppage level on one side of the axle, additional push-button actuation changes the level on the other side of this axle until the limit also applicable on that side is reached. when the vehicle starts out from the stopped position, further procedures depend on the vehicle speed.

At low speed, i.e. a vehicle speed greater than zero but less than the speed corresponding to the traveling state phase 4), a shunting state exists phase 3). During shunting, modifications of the level which were implemented during stoppage should be maintained as closely as possible, however, with the consideration that only even (no inclination) target value instructions are to be issued during any travel state. The target shunting level therefore represents an even level with the current distance between the vehicle frame and the axle center maintained, and is equal to the traveling level less the deviation of the current level of the vehicle frame from the traveling level measured relative to the axle center.

A comparatively long control delay of the vehicle is advantageously set in the shunting state, since during shunting no stabilization of the level should be made, if at all possible.

In contrast with the traveling state, the target shunting level can be changed manually in the shunting state by means of the remote control. The modification of the target shunting level is implemented in the same manner described for the target stoppage level. A modified target stoppage level determines a new current deviation in the vehicle frame level from the traveling level relative to the axle center.

The modification of the target shunting level advantageously permits level adjustments during the shunting state phase 3) for time saving purposes, for example, for preparing in advance of stopping at a loading ramp or for unloading of containers.

Should the vehicle stop again from the shunting state, a new target stoppage level applies in the manner explained for the transition from phase 1 to phase 2, i.e. the actual level is entered upon completion of the delay period.

If the vehicle again proceeds from this stopped condition, i.e. the stoppage state, into a new shunting state, the target shunting level is again determined in the previously explained manner from the current deviation of the measured frame level from the traveling level measured relative to the axle center.

The basic premise behind this inventive principle is the fact that without any manual level modification, the traveling level corresponding to the traveling state applies, even during the shunting phase. If, on the other hand, the level is intentionally changed manually during stoppage or also during the shunting phase itself, the current deviation in a vehicle frame level from the traveling level measured relative to the axle center represents the applicable result of the modification, i.e. the sum of all individual changes creating deviation from the traveling level. This sum may be positive as well as negative.

The change-over between stoppage and shunting may be as frequent as desired, with the target stoppage level always adjusting itself automatically, and the target shunting level being derived from the current distance between traveling level and axle center.

As explained above, the vehicle always initially enters the shunting state phase 3) when travel is initiated from a stopped state. When the vehicle then exceeds a predetermined speed, which may be, for example, 30 km/h, it enters the normal traveling state phase 4) in which the target traveling level is imposed upon the electronic regulator.

The procedure explained for phases 1 to 4 is especially easy to realize because the electronic control system prescribes the target stoppage level, the target shunting level or the target traveling level in accordance with the existing vehicle operating state, or by deactivating the electronic regulator by prescribing the actual level.

Alternative to the described method of entering the actual levels in order to determine the target stoppage level for phase 2, the stoppage level can be determined in a manner having basically the same effect, but which represents a slight variant from a programming point of view. In the modified form, the differential deviations in distance relative to the traveling level are measured at the sensors of a vehicle axle when the delay time is completed. The target stoppage level is then determined by adding the traveling level and the differential deflections on the left and on the right side of the vehicle axle.

What is claimed is:

1. A level control system, as used in a vehicle, which regulates a distance between a vehicle frame and a vehicle axle, the distance compensating for inclinations which cause the vehicle frame to be out of parallel alignment with the vehicle axle in certain states of vehicle operation, comprising:

at least one air suspension bellow which supports the vehicle frame above the vehicle axle, wherein the pressure prevailing in the at least one air suspension bellow determines the distance between the vehicle frame and the vehicle axle, a valve arrangement, which adjusts a pressure of air within the at least one air suspension bellow, at least one sensor, which determines an actual distance between the vehicle frame and the vehicle axle, a regulating system, which receives a target level representative of a desired distance between the vehicle fame and the vehicle axle, the regulating system controlling the valve arrangement in such manner that a control deviation produced from a difference between a predetermined target level and the actual distance, as determined by the at least one sensor, is minimized, and wherein by prescribing a value of the target level equal to the current actual level, a control function of the regulating system can be deactivated, wherein the regulating system is activated for a traveling state, defined as a state where a travel speed of the vehicle exceeds a predetermined minimum speed, and no actuation of a brake takes place, wherein the target level in the traveling state represents the desired distance between the vehicle frame and the vehicle axle while in the traveling state, wherein the regulating system is deactivated in the traveling state by an actuation of the brake, and wherein when the regulating system is deactivated in the traveling state by an actuation of the brake, the regulating system is again activated at the end of a predetermined delay period following the brake actuation.

2. A level control system, as used in a vehicle, which regulates a distance between a vehicle frame and a vehicle axle, the distance compensating for inclinations which cause the vehicle frame to be out of parallel alignment with the vehicle axle in certain states of vehicle operation, comprising:

at least one air suspension bellow, which supports the vehicle frame above the vehicle axle, wherein the pressure prevailing in the at least one air suspension bellow determines the distance between the vehicle frame and the vehicle axle, a valve arrangement, which adjusts a pressure of air within the at least one air suspension bellow, at least one sensor, which determines an actual distance between the vehicle frame and the vehicle axle, a regulating system, which receives a target level representative of a desired distance between the vehicle frame and the vehicle axle, the regulating system controlling the valve arrangement in such manner that a control deviation produced from a difference between a predetermined target level and the actual distance, as determined by the at least one sensor, is minimized, and wherein by prescribing a value of the target level equal to the current actual level, a control function of the regulating system can be deactivated, wherein the regulating system is activated for a stoppage state, defined as a state where a travel speed is equal to zero at the end of a delay period, wherein the target level in the stoppage state represents the desired distance between the vehicle frame and the vehicle axle while in the stoppage state, and wherein the stoppage state follows a delay period of predetermined duration initiated during travel of the vehicle.

3. The level control system of claim 2 wherein the target stoppage level may be manually modified.

4. The level control system of claim 3 herein the modification of the target stoppage level takes place only within a level range which is admissible for the vehicle, and wherein when a limit of the level range has been reached on a first side of the vehicle axle in a course of modification of the target stoppage level, it is possible to modify the level on a second side of the same vehicle axle until the limit of the level range applicable on the second side has been reached.

5. The level control system of claim 4 wherein manual modification of the target stoppage level requires only an actuation of one switch, the switch having at least those switching positions corresponding to functions of lifting and lowering.

6. A level control system, as used in a vehicle, which regulates a distance between a vehicle frame and a vehicle axle, the distance compensating for inclinations which cause the vehicle frame to be out of parallel alignment with the vehicle axle in certain states of vehicle operation, comprising:

at least one air suspension bellow, which supports the vehicle frame above the vehicle axle, wherein the pressure prevailing in the at least one air suspension bellow determines the distance between the vehicle frame and the vehicle axle, a valve arrangement, which adjusts a pressure of air within the at least one air suspension bellow, at least one sensor, which determines an actual distance between the vehicle frame and the vehicle axles a regulating system, which receives a target level representative of a desired distance between the vehicle frame and the vehicle axle, the regulating system controlling the valve arrangement in such manner that a control deviation produced from a difference between a predetermined target level and the actual distance, as determined by the at least one sensor, is minimized, and wherein by prescribing a value of the target level equal to the current actual level, a control function of the regulating system can be deactivated, wherein the actual level of the vehicle frame relative to the vehicle axle is indicated to the regulating system for use as the target level during a stoppage state, when the vehicle is standing still, even when the actual level reflects a vehicle inclination due to stoppage from a travel situation, and wherein the actual level used for the indication of the target level is determined at the end of a predetermined delay period following the point in time when the inclination occurs.

7. The level control system of claim 6 wherein the regulating system is activated at the end of the predetermined delay period.

8. The level control system of claim 7 wherein the activation is effected only at a vehicle speed of zero.

9. The level control system of claim 6 wherein level changes due to a change in load are compensated for when the regulating system is activated.

10. A level control system, as used in a vehicle, which regulates a distance between a vehicle frame and a vehicle axle, the distance compensating for inclinations which cause the vehicle frame to be out of parallel alignment with the vehicle axle in certain states of vehicle operation, comprising:

at least one air suspension bellow, which supports the vehicle frame above the vehicle axle, wherein the pressure prevailing in the at least one air suspension bellow determines the distance between the vehicle frame and the vehicle axle, a valve arrangement, which adjusts a pressure of air within the at least one air suspension bellow, at least one sensor, which determines an actual distance between the vehicle frame and the vehicle axle, a regulating system, which receives a target level representative of a desired distance between the vehicle frame and the vehicle axle, the regulating system controlling the valve arrangement in such manner that a control deviation produced from a difference between a predetermined target level and the actual distance, as determined by the at least one sensor, is minimized, and wherein by prescribing a value of the target level equal to the current actual level, a control function of the regulating system can be deactivated, wherein the regulating system is activated for a shunting state, defined as a travel condition during which a travel speed is below a predetermined minimum speed which defines a traveling state, wherein the target level is a target shunting level, which is determined by the desired distance between the vehicle frame and the vehicle axle when the vehicle is in a stoppage state, where the travel speed equals zero after a predetermined delay period, and wherein, starting up from a stoppage state, the shunting state is detected when a travel speed is greater than zero, but less than a predetermined minimum speed which determines a traveling state.

11. The level control system of claim 10 wherein the target shunting level is an even (non-inclined) level, equal to a traveling level less the deviation of the current level of the vehicle frame from the traveling level, as measured relative to an axle center, wherein the current deviation from the traveling level is the result of manual level adjustment.

12. The level control system of claim 10 wherein the target shunting level can be changed manually.

13. The level control system of claim 12 wherein the modification of the target shunting level takes place only within a level range which is admissible for the vehicle.

14. The level control system of claim 13 wherein manual modification of the target shunting level requires only an actuation of one switch, the switch having at least those switching positions corresponding to functions of lifting and lowering.

* * * * *